United States Patent
Furman et al.

(10) Patent No.: US 12,047,682 B1
(45) Date of Patent: Jul. 23, 2024

(54) METHOD AND APPARATUS FOR ADJUSTING A FIELD OF VIEW OF A CAMERA BASED ON A DETECTION OF A BLEMISH ON A CAMERA LENS

(71) Applicant: MOTOROLA SOLUTIONS, INC., Chicago, IL (US)

(72) Inventors: Piotr Furman, Grojec (PL); Lukasz Osuch, Pszczyna (PL); Wojciech Wojcik, Cracow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 73 days.

(21) Appl. No.: 18/155,085

(22) Filed: Jan. 17, 2023

(51) Int. Cl.
  *H04N 23/695* (2023.01)
  *H04N 23/69* (2023.01)

(52) U.S. Cl.
  CPC ........... *H04N 23/695* (2023.01); *H04N 23/69* (2023.01)

(58) Field of Classification Search
  CPC ...... H04N 23/695; H04N 23/69; H04N 23/66; H04N 23/661; H04N 23/611; H04N 23/62; H04N 23/51; H04N 7/183; H04N 7/188; H04N 7/185; G08B 13/19636; G08B 13/19697; G08B 13/19608; G08B 13/1963; G03B 17/08; G03B 17/56; B60S 1/52; B60S 1/56; B60R 2300/10; B60R 2300/802
  USPC ...................................................... 348/240.3
  See application file for complete search history.

(56) References Cited

U.S. PATENT DOCUMENTS

| | | | |
|---|---|---|---|
| 9,445,057 B2 * | 9/2016 | May | G06T 7/70 |
| 9,781,348 B1 * | 10/2017 | Bart | H04N 7/183 |
| 9,973,663 B2 | 5/2018 | Krajisnik | |
| 10,089,540 B2 * | 10/2018 | May | H04N 7/18 |
| 10,200,621 B1 | 2/2019 | Bart et al. | |
| 10,643,338 B2 * | 5/2020 | Miyazawa | G06V 10/62 |
| 10,715,752 B2 * | 7/2020 | Ferrari | G06T 7/90 |
| 10,836,356 B2 * | 11/2020 | Herman | G02B 27/0006 |
| 10,983,198 B2 * | 4/2021 | Fujita | G01S 7/497 |
| 11,451,765 B2 * | 9/2022 | Hunt | G01S 7/497 |
| 11,505,202 B2 * | 11/2022 | Zhang | G05D 1/0088 |
| 11,668,804 B2 * | 6/2023 | Herman | B60S 1/56 356/4.01 |
| 11,904,884 B2 * | 2/2024 | Zhang | G05D 23/024 |
| 2015/0329088 A1 * | 11/2015 | Krajisnik | B60S 1/56 348/148 |
| 2016/0127695 A1 | 5/2016 | Zhang et al. | |
| 2016/0379067 A1 * | 12/2016 | May | H04N 23/811 382/103 |
| 2020/0047717 A1 * | 2/2020 | Frederick | G02B 27/0006 |
| 2021/0107040 A1 * | 4/2021 | Violetta | B08B 3/041 |
| 2021/0394774 A1 * | 12/2021 | Zhang | B60W 60/0025 |

(Continued)

Primary Examiner — Pritham D Prabhakher (57) ABSTRACT

A method and apparatus for operating a camera is provided herein. During operation a camera having pan/tilt/zoom (PTZ) capabilities will have its field of view (FOV) moved such that any detected blemish on the camera lies over an area with low activity (i.e., a low history of detected motion). More particularly, when it has been determined that a blemish or blemish resides on a camera's lens, a heat map of activity within the current FOV is determined. More active areas of the FOV are marked as "hot", while less active areas of activity are marked as "cold". The camera is then aligned such that the dirty portion of the lens does not align with any "hot" part of the heat map.

10 Claims, 6 Drawing Sheets

(56) References Cited

U.S. PATENT DOCUMENTS

2022/0292649 A1\* 9/2022 Wang .................. G06T 7/269
2023/0045125 A1\* 2/2023 Zhang ................ G06T 7/0004

\* cited by examiner

METHOD AND APPARATUS FOR ADJUSTING A FIELD OF VIEW OF A CAMERA BASED ON A DETECTION OF A BLEMISH ON A CAMERA LENS

BACKGROUND OF THE INVENTION

The use of surveillance cameras continues to grow across enterprise and public safety markets. As technology advances, the resolution and detection capabilities of cameras continue to improve. Camera capabilities have advanced so much that even the smallest amount of dirt on a camera lens can significantly reduce the resolution and detection capabilities of the camera. With this in mind, prior-art techniques to address this issue have revolved around methods to detect dirt on a camera lens, and clean the camera lens when the dirt is detected. For example, U.S. Pat. No. 10,089,540, entitled VEHICLE VISION SYSTEM WITH DIRT DETECTION, and incorporated by reference herein, provides a vision system that is operable to detect light and dark blemishes in captured image data and is operable to determine when such blemishes are indicative of dirt or water droplets or the like at the lens of the camera. After detection of dirt, various cleaning techniques are usually employed to remove the detected dirt.

While systems for automatically detecting and cleaning a camera lens will improve the resolution and detection capabilities of cameras, oftentimes these systems are costly. Therefore a need exists for a method and apparatus for improving the resolution and detection capabilities of a dirty camera without the costly components necessary to automatically clean the camera lens.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention.

Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need, a method and apparatus for operating a camera is provided herein. During operation a camera having pan/tilt/zoom (PTZ) capabilities will have its field of view (FOV) moved such that any detected blemish on the camera lens lies over a geographic area with low activity (i.e., a physical geographic area having a low history of detected motion). More particularly, when it has been determined that a blemish resides on a camera's lens, a heat map of activity of the geographic area near the camera will be created. The heat map may be used to align the camera such that the blemish on the lens does not align with any "hot" geographic area. (Geographic areas having more activity are identified as "hot", while geographic areas having less activity are identified as "cold").

The term "blemish" is meant to encompass any mark or flaw that resides on a camera lens which spoils the appearance of something that is occulted by the blemish. With this in mind, any scratch, dirt, water, oil, . . . , etc. can be thought of as a blemish. A camera lens having a blemish is referred to as a dirty camera lens herein.

A "hot" area on a heat map is preferably an area that has more activity (detected motion) than a "cold" area. A hot area may comprise a geographic area on a heat map having over a predetermined amount of detected activity within a period of time. For example, a hot area on a heat map may comprise a geographic area having over 50 times where motion was detected per day. In a similar manner, a "cold" area on the heat map may comprise an area having under a predetermined amount of detected activity within a period of time. For example, a cold area on a heat map may comprise geographic area having under 2 times where motion was detected per day.

In one embodiment of the present invention, the camera will be panned, tilted, and/or zoomed an absolute minimum amount necessary in order to move the blemish on the lens to cover a "cold" geographic area of the heat map. For example, if there exists two equally "cold" blemishes within the mapped geographic area, the camera will be moved/zoomed so that the blemish on the camera lens covers the geographic area of the one cold blemish that requires the least amount of panning and tilting of the camera.

In another embodiment of the present invention, the camera will be panned, tilted, and/or zoomed such that the blemish on the camera lens does not lie over a geographic area corresponding to a "hottest" geographic area of the heat map. The camera will be panned and tilted a minimum amount necessary to move the blemish on the lens away from a hottest geographic area.

In yet another embodiment of the present invention, the camera will be panned, tilted, and/or zoomed such that the blemish is moved to a geographic area of low activity while still maintaining the geographic hot areas within the FOV.

Figure 1:
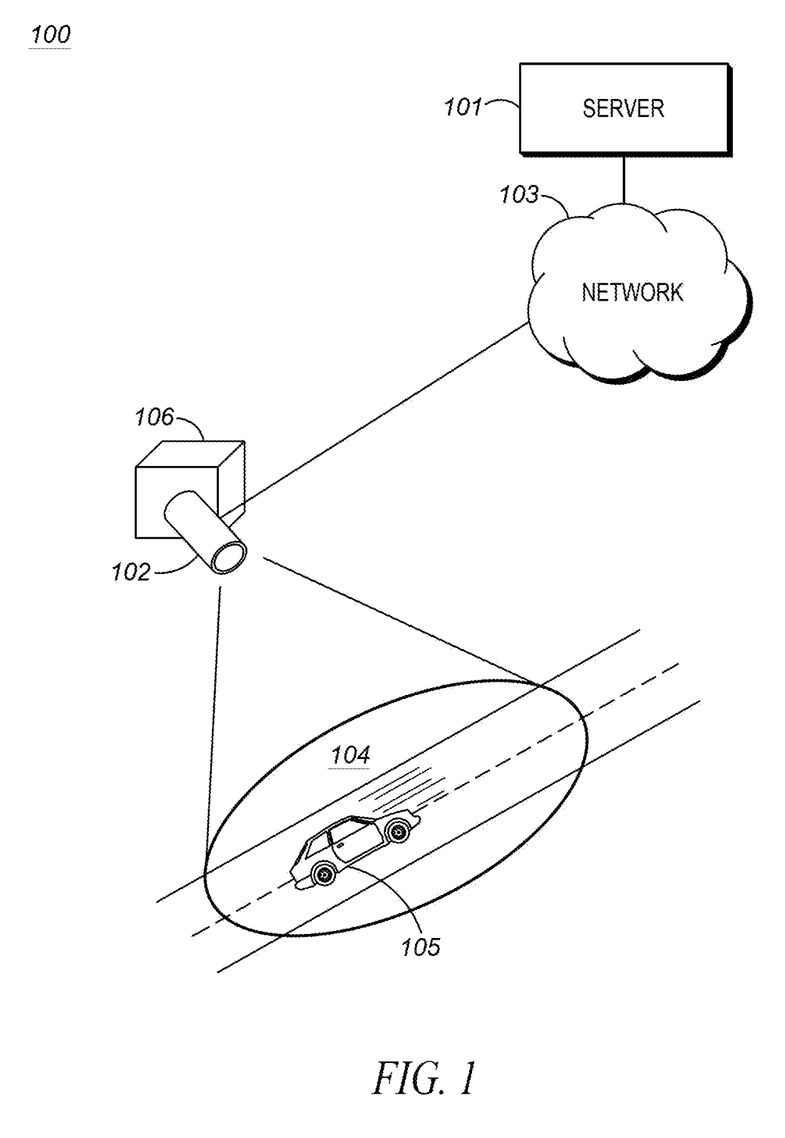
FIG. 1 illustrates a general operating environment.

With the above in mind, FIG. 1 illustrates a general operating environment 100 for the present invention. As shown, environment 100 is equipped with at least one camera 102 positioned to capture images/video of objects as they roam through the camera's FOV 104. The camera's FOV 104 may be changed via automated manipulation of Pan, Tilt, and Zoom (PTZ) motors 106 attached to camera 102. This allows the camera's FOV 104 to encompass various geographic areas as the camera is moved. The movement of the camera's FOV will result in differing geographic areas of the surroundings moving into, and out of the camera's FOV. It should be noted that because any blemish on the camera lens is fixed to the camera lens, any geographic area viewed by camera 102 will have the same blemish at the same location within the FOV.

In an alternate embodiment of the present invention, the selected field of view is moved via digital manipulation of a captured fixed field of view. In such embodiments, camera 102 is typically configured with a high resolution, wide angle lens and a high definition sensor. The camera then applies post processing techniques to digitally pan, tilt, and zoom a dynamically selected, narrow field of view within the fixed, captured, wide angle field of view.

In yet another embodiment of the present invention, part of the PTZ capabilities allow motors 106 to move camera 102 to different geographic locations (like a camera on a moveable track or mounted in an unmanned aerial vehicle) in order to see a new field of view. In all cases, a camera may continually move its field of view as described above in order to place a dirty region of the camera lens over a least active area within the camera's current FOV. Thus, the camera can change its FOV from a first FOV to a second FOV (covering differing (but potentially overlapping) geographic areas) so that the second FOV places blemish on the camera lens over a least active area detected within the first FOV.

Server 101 is configured to store any video or images obtained from camera 102, determine an activity heat map, determine that a camera lens is dirty (i.e., a blemish exists on the camera lens), and move the FOV from viewing a first geographic area to viewing a second geographic area based on the heat map and location of the blemish on the camera lens. Server 101 may be configured to use various imaging techniques to identify an object, track the object, determine objects entering or exiting FOV 104, predict where an object is moving, determine identifying characteristics of the objects, provide facial recognition, . . . , etc. In order to accomplish this, camera 102 is attached (i.e., connected) to server 101 through network 103 via a network interface. Example networks include any combination of wired and wireless networks, such as Ethernet, T1, Fiber, USB, IEEE 802.11, 3GPP LTE, and the like. During operation, server 101 receives video feeds from camera 102 and provides operating instructions to camera 102 and PTZ motors 106.

Figure 2:
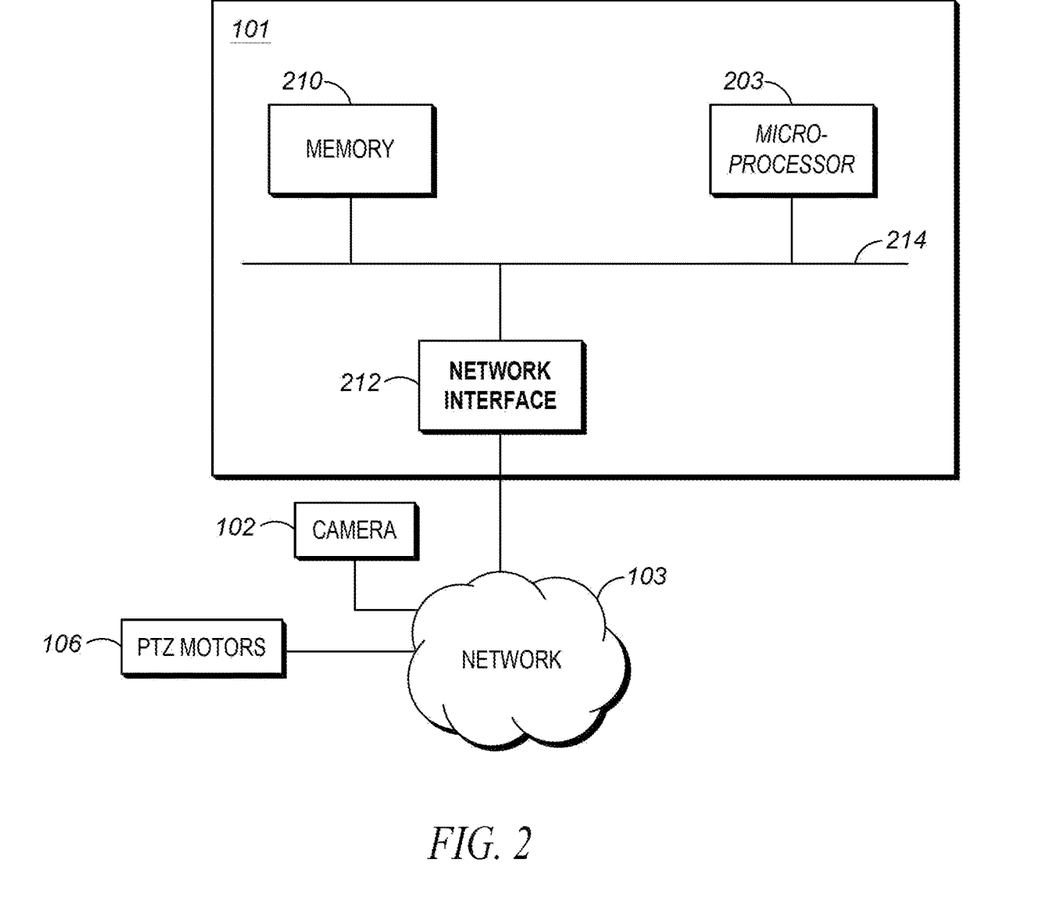
FIG. 2 is a block diagram of the server of FIG. 1.

FIG. 2 illustrates a block diagram of server 101 in accordance with some embodiments. Server 101 may include various components connected by a bus 214. Server 101 may include a hardware processor (logic circuitry) 203 such as one or more central processing units (CPUs) or other processing circuitry able to provide any of the functionality described herein when running instructions. Processor 203 may be connected to memory 210 that may include a non-transitory machine-readable medium on which is stored one or more sets of instructions. Memory 210 may include one or more of static or dynamic storage, or removable or non-removable storage, for example. A machine-readable medium may include any medium that is capable of storing, encoding, or carrying instructions for execution by processor 203, such as solid-state memories, magnetic media, and optical media. Machine-readable medium may include, for example, Electrically Programmable Read-Only Memory (EPROM), Random Access Memory (RAM), or flash memory.

The instructions stored in memory 210 enable server 101 and camera 102 to operate in any manner thus programmed, such as the functionality described specifically herein, when processor 203 executes the instructions. The machine-readable medium may be stored as a single medium or in multiple media, in a centralized or distributed manner. In some embodiments, instructions may further be transmitted or received over a communications network via a network interface 212 utilizing any one of a number of transfer protocols (e.g., frame relay, internet protocol (IP), transmission control protocol (TCP), user datagram protocol (UDP), hypertext transfer protocol (HTTP), etc.).

Network interface 212 may thus enable server 101 to communicate data and send/receive control information with other devices (e.g., camera 102 and PTZ motors 106) through network 103 via wired or wireless communication. Network interface 212 may include electronic components such as a transceiver that enables serial or parallel communication. The wireless connections may use one or more protocols, including Institute of Electrical and Electronics Engineers (IEEE) Wi-Fi 802.11, Long Term Evolution (LTE)/4G, 5G, Universal Mobile Telecommunications System (UMTS), or peer-to-peer (P2P), for example, or short-range protocols such as Bluetooth, Zigbee, or near field communication (NFC). Wireless communication may occur in one or more bands, such as the 800-900 MHz range, 1.8-1.9 GHZ range, 2.3-2.4 GHz range, 60 GHz range, and others, including infrared (IR) communications. Example communication networks to which server 101 may be connected via network interface 212 may include a local area network (LAN), a wide area network (WAN), a packet data network (e.g., the Internet), mobile telephone networks (e.g., cellular networks), and wireless data networks.

Camera 102 includes circuitry to image its geographic surroundings within the camera's FOV. Camera 102 electronically captures a sequence of video frames (i.e., a sequence of one or more still images) of a FOV, with optional accompanying audio, in a digital format at a particular frame rate. The images or video captured by the image/video camera 206 may be stored in the storage component 210, or within internal memory (not shown).

PTZ motors 106 comprise mechanical motors to manipulate the camera's field of view in order to image various geographic areas. In other embodiments of cameras, the PTZ motors 106 may be replaced by a controller that utilizes digital processing to crop and/or zoom a captured field of view to generate the requested field of view.

It should be noted that in alternate embodiments of the present invention, camera 102 and PTZ motors 106 may be encompassed within server 101, with bus 214 considered an "interface" used for connecting camera 102 and PTZ motors 106 to processor 203 and memory 210.

Creating a Heat Map of Activity

The heat map of activity is created to color or shade various geographic areas differently based on how "active" they are. A more "active" area comprises an area having more motion detected over a period of time, although in alternate embodiments of the present invention, a more "active" area may comprise an area having more of a particular object detected over time (e.g., more people detected, more vehicles detected, more avalanches detected, more fires detected, . . . , etc.).

In one embodiment of the present invention, logic circuitry 203 receives a video feed from camera 102 and determines geographic areas where motion is detected. Logic circuitry 203 keeps track of how many times any particular geographic area had detected motion. For example, one geographic area of FOV 104 may detect motion on average of 100 times a day, while another geographic area of FOV 104 may detect motion only on average of 3 times a day, . . . , etc. This information is stored in memory 210, and a heat map is created based on this information.

The above process can take place over very short periods (e.g., less than a second so that instantaneous motion is determined) or over longer periods of time (e.g., days, weeks, months). As discussed above, the heat map may be created by shading the geographic area in such a way that those geographic areas that had many instances of detected motion are shaded a particular color or gray scale. For example, geographic areas with over 50 instances of detected motion may be shaded red, while geographic areas between 40 and 50 instances of detected motion may be shaded orange. Regardless of the color coding/gray scale used, a heat map of "activity" is created by this process. This heat map basically represents the geographic area within FOV 104 having shaded areas that indicate geographic areas that have higher and lower histories of detected motion, and will be a good predictor of future probability of motion occurring.

In another embodiment of the present invention the heat map may be created by averaging each geographic area's amount of detected motion over a particular time period. For example, a first geographic area may have an average of 50 instances of detected motion per day, while a second geographic area may have an average of 10 instances of detected motion per day. In the creation of the heat map, these two geographic areas may be shaded different colors.

With the above in mind, FIG. 2 comprises an apparatus 101 comprising interface 212 configured to receive an image from a camera and transmit instructions to the camera to modify the camera's Pan, Tilt, and/or Zoom (PTZ). (If camera 101 PTZ motors 106 are located within apparatus 101, then bus 214 may be considered the interface). Apparatus 101 also comprises logic circuitry 203 configured to receive images from the camera via the interface, determine that a portion of the camera's FOV is covered by a blemish, determine geographic areas within or surrounding the camera's FOV that have high activity, and cause the camera to adjust its pan, tilt, and/or zoom to move the camera's FOV to a second FOV, wherein the camera's second FOV places the blemish within the second FOV so that it does not cover the geographic areas within or surrounding the camera's FOV that have high activity.

As discussed above, the geographic areas within or surrounding the camera's FOV that have high activity comprises geographic areas where motion is detected at a rate higher than a predetermine threshold.

Additionally, the logic circuitry may create an activity heat map of the camera's surroundings and determine the geographic areas within or surrounding the camera's FOV that have high activity by identifying the geographic areas within or surrounding the cameras FOV that have high activity based on the heat map.

Additionally, logic circuitry 203 may cause the camera to adjust its pan, tilt, or zoom by sending instructions via network interface 212 (or bus 214), moving the camera a minimum amount necessary in order to move the blemish on the lens to cover a "cold" geographic area of the heat map.

Additionally, logic circuitry 203 may cause the camera to adjust its pan, tilt, or zoom by sending instructions to the camera via interface 212 (or bus 214), moving the camera a minimum amount necessary in order to move the blemish on the lens to cover an area of low activity.

Figure 3:
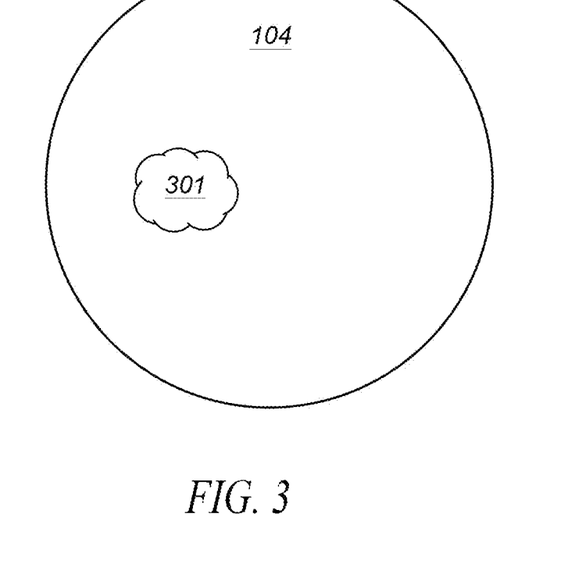
FIG. 3 illustrates a blemish on a camera lens.
Figure 4:
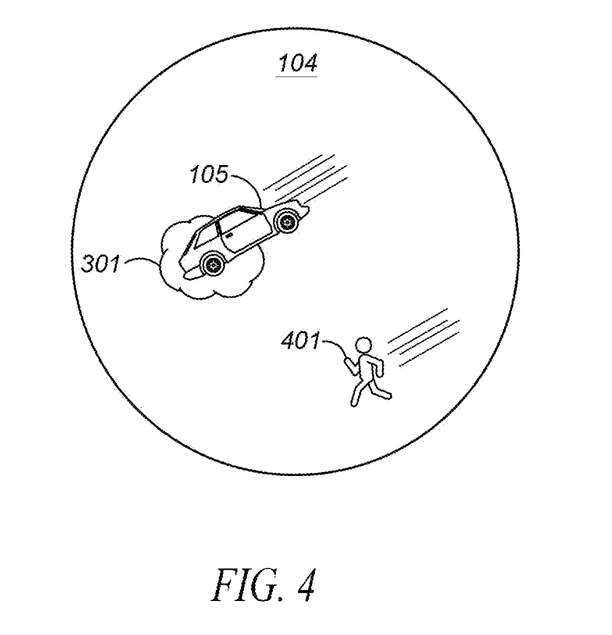
FIG. 4 illustrates the blemish of FIG. 3 obstructing an object of interest.

FIG. 3 through FIG. 9 illustrate the detection of a blemish on a camera lens and the movement of the cameras FOV in response. As shown in FIG. 3, FOV 104 has blemish 301 existing on the camera lens that covers a portion of FOV 104. The location of this blemish may overlap a geographic area comprising objects that are of interest. For example, in FIG. 4, FOV 104 comprises automobile 105 being covered by blemish 301 at a particular instance, while pedestrian 401 is not. Blemish 301 may be detected in any known manner, but, preferably as described above with in the '540 patent by identifying dark regions within where light cannot shine through. Several cameras may be utilized to detect such regions. Any blemish on a camera lens may also be determined by pointing the camera towards a bright area and simultaneously panning the camera to see if any spots on the camera remain motionless while panning. The motionless spots will be identified as blemishes.

Figure 5:
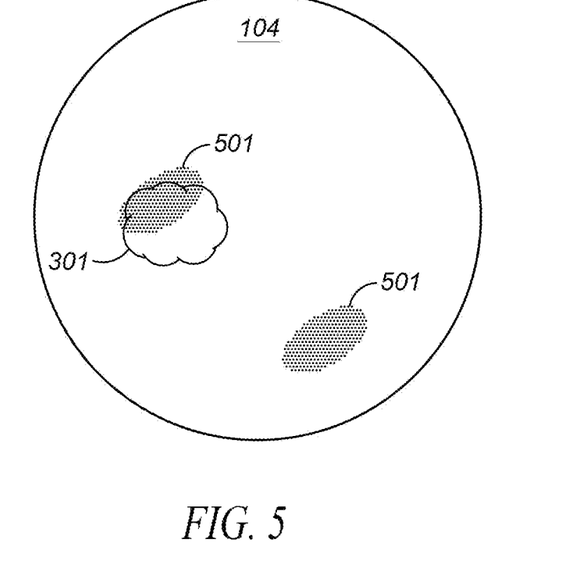
FIG. 5 illustrates the blemish of FIG. 3 and areas of higher activity (motion) represented as a heat map.
Figure 6:
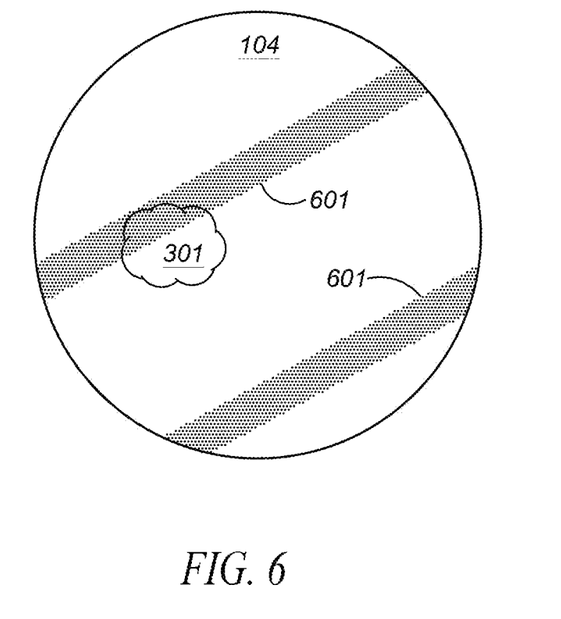
FIG. 6 illustrates the blemish of FIG. 3 and areas of higher activity (motion) represented as a heat map.

FIG. 5 illustrates FOV 104 having an instantaneous heat map overlaid. In this example, a heat map showing instantaneous activity (e.g., motion detected in real time by, for example, determining geographic areas of motion over the past 0.5 seconds) has two geographic areas of high activity 501. In another embodiment of the present invention, the heat map may comprise an indication of detected motion over a longer period of time (e.g., a heat map representing how many times during a day that a geographic area detected motion). This is illustrated in FIG. 6 with geographic areas 601 indicating locations that have higher instances of motion being detected over a longer period of time.

Figure 7:
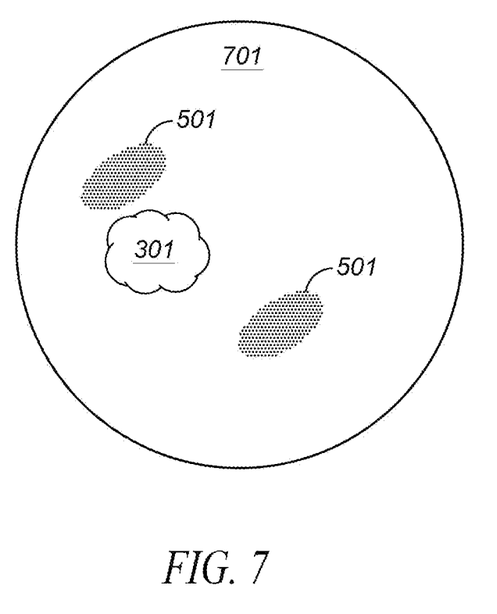
FIG. 7 illustrates the blemish of FIG. 3 and areas of higher activity (motion) represented as a heat map when moving the field of view of a camera.
Figure 8:
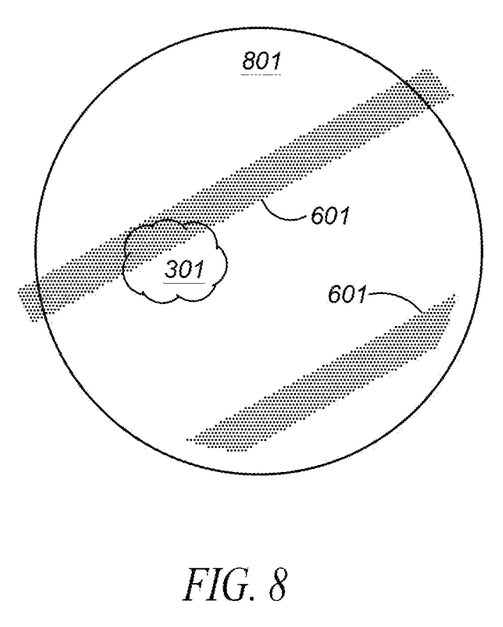
FIG. 8 illustrates the blemish of FIG. 3 and areas of higher activity (motion) represented as a heat map when moving the field of view of a camera.
Figure 9:
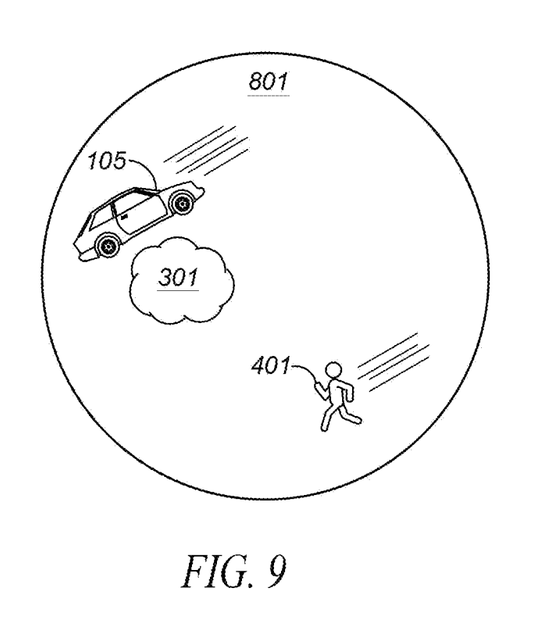
FIG. 9 illustrates the blemish of FIG. 3 and the objects of interest of FIG. 4 within a new field of view of a camera.

Regardless of the type of heat map utilized (i.e., instantaneous, accumulated number of instances, or averaged), PTZ motors 106 will be activated to adjust the FOV of camera 102 such that the blemish is moved outside the geographic areas having a high activity. As shown in FIG. 7, camera 102 is moved so that FOV 701 places blemish 301 outside high activity geographic areas 501 (i.e., camera is moved or zoomed from FOV 104 to FOV 701). In a similar manner camera 102 may be moved to a new FOV 801 via PTZ motors 106 so that blemish 301 is place outside of geographic areas 501. When the FOV is moved as described, automobile 105 and pedestrian 401 will not be covered by blemish 301. This is illustrated in FIG. 9, showing automobile 105 and pedestrian 401 within FOV 801.

Figure 10:
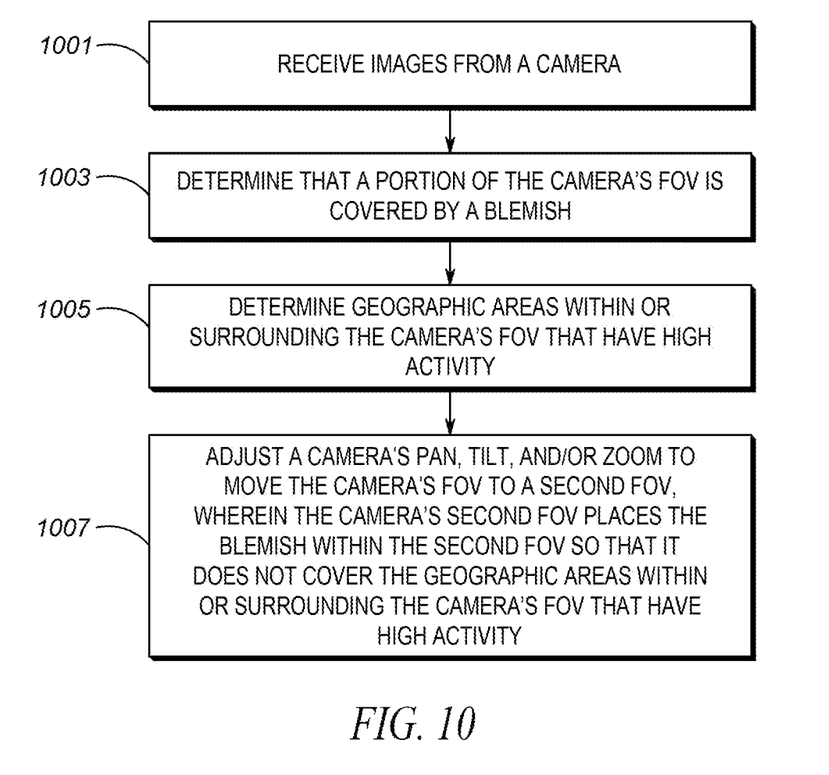
FIG. 10 is a flow chart showing operation of the server of FIG. 2.

FIG. 10 is a flow chart showing operation of server 101. The logic flow begins at step 1001 where logic circuitry receives images from a camera. At step 1003, logic circuitry 203 determines that a portion of the camera's FOV is covered by a blemish. Geographic areas within or surrounding the camera's FOV that have high activity are then determined (step 1005), and at step 1007 logic circuitry 203 adjusts the camera's pan, tilt, and/or zoom to move the camera's FOV to a second FOV, wherein the camera's second FOV places the blemish within the second FOV so that it does not cover the geographic areas within or surrounding the camera's FOV that have high activity.

As discussed, the geographic areas within or surrounding the camera's FOV that have high activity comprises geographic areas where motion is detected at a rate or number higher than a predetermine threshold.

As discussed, a heat map of activity (activity heat map) may be created, and used for identifying the geographic areas within or surrounding the cameras FOV that have high activity from the heat map.

The step of adjusting may comprise the step of adjusting a minimum amount necessary in order to move the blemish on the lens to cover a "cold" geographic area of the heat map, or adjusting a minimum amount necessary in order to move the blemish on the lens to cover an area of low activity.

In the foregoing specification, specific embodiments have been described. However, one of ordinary skill in the art appreciates that various modifications and changes can be made without departing from the scope of the invention as set forth in the claims below. For example, the description above provided for a server determining a blemish exists on a camera lens and instructing PTZ motors to move the blemish onto a less active area of the camera's FOV. However, one of ordinary skill in the art will recognize that this functionality may be placed directly within camera 102 such that camera 102 is equipped with logic circuitry 203 and other necessary components to perform the functions described above. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:
an interface configured to receive an image from a camera and transmit instructions to the camera to modify the camera's Pan, Tilt, and/or Zoom (PTZ);
logic circuitry configured to:
receive images from the camera via the interface;
determine that a portion of the camera's lens is covered by a blemish;

determine geographic areas within or surrounding the camera's field of view (FOV) that have high activity; and cause the camera to adjust its pan, tilt, and/or zoom to move the camera's FOV to a second FOV, wherein the camera's second FOV places the blemish within the second FOV so that it does not cover the geographic areas within or surrounding the camera's FOV that have high activity.

2. The apparatus of claim 1 wherein the geographic areas within or surrounding the camera's FOV that have high activity comprises geographic areas where motion is detected at a rate higher than a predetermine threshold.

3. The apparatus of claim 2 wherein the logic circuitry determines the geographic areas within or surrounding the camera's FOV that have high activity by:

creating an activity heat map of the camera's surroundings; and identifying the geographic areas within or surrounding the cameras FOV that have high activity from the heat map.

4. The apparatus of claim 3 wherein the logic circuitry causes the camera to adjust its pan, tilt, or zoom by moving the camera a minimum amount necessary in order to move the blemish on the lens to cover a "cold" cold geographic area of the heat map.

5. The apparatus of claim 1 wherein the logic circuitry causes the camera to adjust its pan, tilt, or zoom by moving the camera a minimum amount necessary in order to move the blemish on the lens to cover an area of low activity.

6. A method comprising the steps of:
receiving images from a camera;
determining that a portion of the camera's lens is covered by a blemish;
determining geographic areas within or surrounding the camera's field of view (FOV) that have high activity; and
adjusting the camera's pan, tilt, and/or zoom to move the camera's FOV to a second FOV, wherein the camera's second FOV places the blemish within the second FOV so that it does not cover the geographic areas within or surrounding the camera's FOV that have high activity.

7. The method of claim 6 wherein the geographic areas within or surrounding the camera's FOV that have high activity comprises geographic areas where motion is detected at a rate higher than a predetermine threshold.

8. The method of claim 7 further comprising the steps of:
creating an activity heat map of the camera's surroundings; and
identifying the geographic areas within or surrounding the cameras FOV that have high activity from the heat map.

9. The method of claim 8 wherein the step of adjusting comprises the step of adjusting a minimum amount necessary in order to move the blemish on the lens to cover a cold geographic area of the heat map.

10. The method of claim 6 wherein the step of adjusting comprises the step of adjusting a minimum amount necessary in order to move the blemish on the lens to cover an area of low activity.

* * * * *